US009809091B2

(12) United States Patent
Benson

(10) Patent No.: US 9,809,091 B2
(45) Date of Patent: Nov. 7, 2017

(54) ADJUSTABLY POSITIONABLE SPACER FOR VEHICLE DOOR ASSEMBLY

(71) Applicant: Toyota Motor Engineering & Manufacturing North America, Inc., Erlanger, KY (US)

(72) Inventor: Blaine C. Benson, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/079,787

(22) Filed: Mar. 24, 2016

(65) Prior Publication Data

US 2017/0274743 A1    Sep. 28, 2017

(51) Int. Cl.
*B60J 5/04*    (2006.01)

(52) U.S. Cl.
CPC ........... *B60J 5/0443* (2013.01); *B60J 5/0437* (2013.01); *B60J 5/0468* (2013.01)

(58) Field of Classification Search
CPC . B60J 5/04; B60J 5/0443; B60J 5/0468; B60J 5/0437
USPC ......................................... 296/146.6, 187.12
See application file for complete search history.

(56) References Cited

U.S. PATENT DOCUMENTS

| 4,685,722 | A | * | 8/1987 | Srock | ..................... B60J 5/0426 293/128 |
| 8,371,639 | B2 | | 2/2013 | Danaj et al. | |
| 2009/0026795 | A1 | * | 1/2009 | Tate | ...................... B60J 5/0437 296/146.6 |
| 2012/0091750 | A1 | * | 4/2012 | Danaj | .................... B60J 5/0443 296/146.6 |
| 2014/0260079 | A1 | * | 9/2014 | Flener | .................... B60J 5/0437 52/764 |
| 2017/0072775 | A1 | * | 3/2017 | Kindaichi | ........... B60R 21/0136 |

FOREIGN PATENT DOCUMENTS

JP    2000238536 A    9/2000

* cited by examiner

*Primary Examiner* — Gregory Blankenship
(74) *Attorney, Agent, or Firm* — Christopher G. Darrow; Darrow Mustafa PC

(57) ABSTRACT

A spacer is provided for mounting on a vehicle impact beam. The spacer includes a first surface having a first radius of curvature centered on a first axis, and a second surface opposite the first surface, the second surface having a second radius of curvature centered on a second axis extending parallel to the first axis and spaced apart from the first axis.

12 Claims, 4 Drawing Sheets

ADJUSTABLY POSITIONABLE SPACER FOR VEHICLE DOOR ASSEMBLY

TECHNICAL FIELD

The embodiments described herein relate generally to a door assembly for a vehicle, and more specifically to a spacer coupled to an impact beam of the door assembly for supporting a filler material to maintain a support between a door impact beam and an exterior panel of the door assembly.

BACKGROUND

Door assemblies for vehicles may include an impact beam that extends between a first edge and a second edge of the door. The impact beam increases resistance against side impacts. The impact beam may be spaced from an interior surface of an exterior door panel (i.e., skin) of the door assembly. In order to minimize undesirable noise and/or vibration in the exterior panel when opening and closing the door and during operation of the vehicle, a filler compound may be disposed between the impact beam and the exterior panel of the door assembly. The filler compound reduces and/or prevents vibration in the exterior panel.

However, the filler compound is only capable of spanning or filling a predetermined maximum distance between the impact beam and the door panel. Accordingly, for application of the filler material to the beam and the exterior panel, the impact beam must be disposed within the maximum allowable distance from the interior surface of the exterior panel. If the distance between the impact beam and the exterior panel exceeds the maximum spacing allowed for application of the filler material, a spacer may be used to occupy a portion of the distance between the beam and the exterior panel, and to provide an application surface for the filler material. However, the distance between the impact beam and the exterior panel may vary with the longitudinal location along the impact beam. Also, the spacing between the impact beam and the exterior panel may vary between vehicle models and/or models of door assemblies. Thus, multiple spacer designs may be required to enable filler material application in a single door assembly and/or in door assemblies across multiple vehicle designs.

SUMMARY

In one aspect of the embodiments described herein, a spacer is provided for mounting on a vehicle impact beam. The spacer includes a first surface having a first radius of curvature centered on a first axis, and a second surface opposite the first surface, the second surface having a second radius of curvature centered on a second axis extending parallel to the first axis and spaced apart from the first axis.

In another aspect of the embodiments described herein, a door assembly for a vehicle is provided. The assembly includes an exterior panel, an interior panel positioned opposite and spaced apart from the exterior panel, and an impact beam coupled to the exterior panel between the interior panel and the exterior panel. A spacer is mounted on the impact beam, the spacer having a surface positioned opposite the exterior panel and structured such that a distance from a central axis of the beam to the surface varies according to a location along the surface.

In another aspect of the embodiments described herein, a method for fabricating a vehicle door assembly is provided. The method includes steps of providing a vehicle door exterior panel; coupling an impact beam to the exterior panel; providing a spacer structured for securement to the impact beam, the spacer including a surface structured to be adjustably positionable so as to provide any one of a predetermined range of separation distances between the surface and the exterior panel prior to securement of the spacer to the impact beam; positioning the spacer along the beam so as to provide a predetermined separation distance between the surface and the exterior panel; and securing the spacer in the position providing the predetermined separation distance between the surface and the exterior panel.

DETAILED DESCRIPTION

Figure 1:
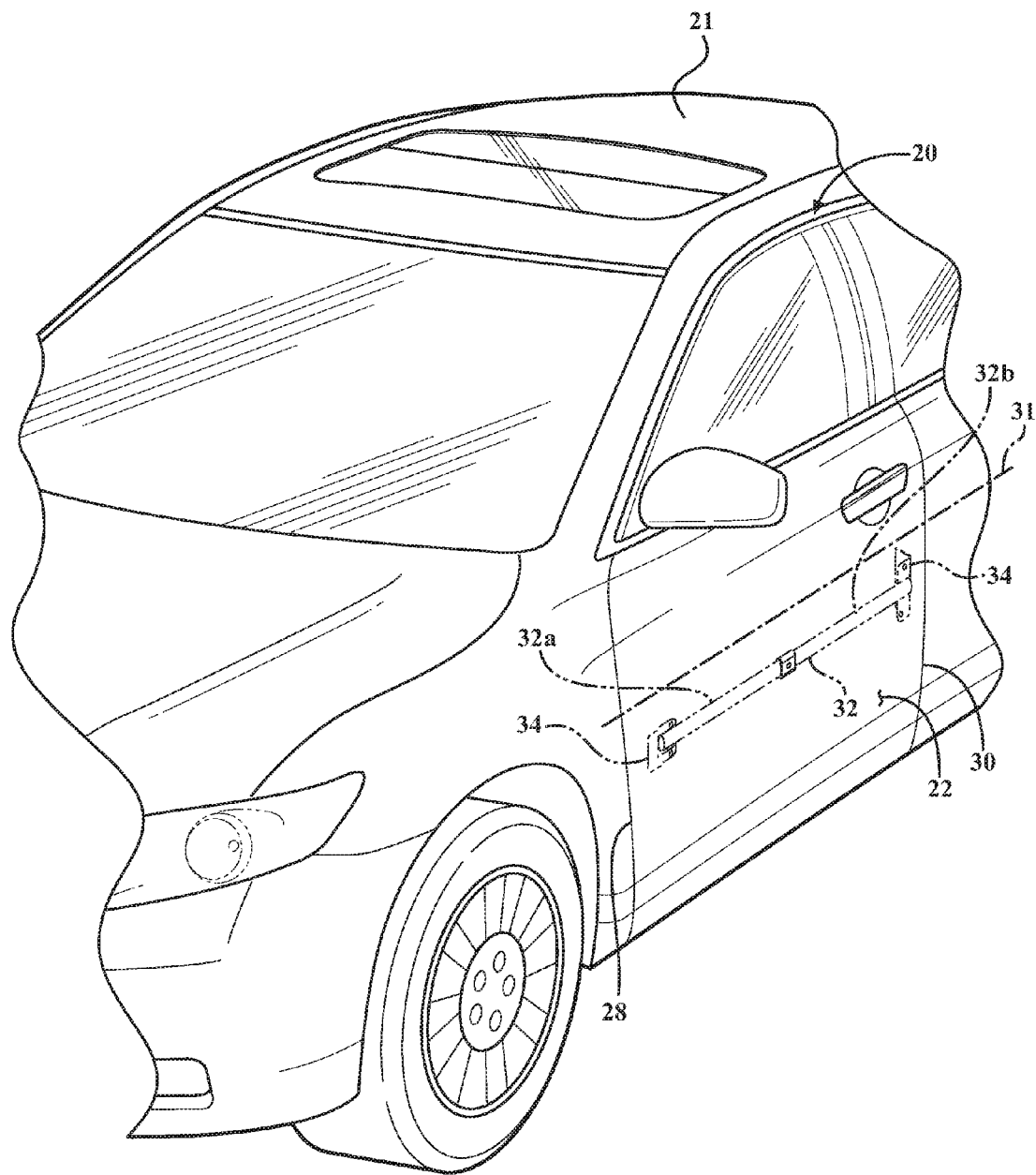
FIG. 1 is a schematic perspective view of a door assembly for a vehicle.

Embodiments described herein relate to a spacer structured for mounting on a vehicle door impact beam. The spacer occupies a portion of the space between the beam and a panel forming an outer skin of the door. The spacer also provides an application or mounting surface for a filler material (such as a mastic adhesive) which occupies the space between the spacer and the door panel. The spacer is structured to be adjustably positionable to enable the amount of space occupied by the spacer between the beam and the door panel to be varied, according to the requirements of a particular application.

Referring to the drawings, wherein like numerals indicate like parts throughout the several views, a door assembly is shown generally at 20, attached to a vehicle 21. The door assembly 20 is for a vehicle. The door assembly 20 may include, but is not limited to, a side passenger door for the vehicle. The door assembly 20 may be sized, shaped and/or configured in any suitable manner necessary to meet the design considerations of the vehicle.

Figure 2:
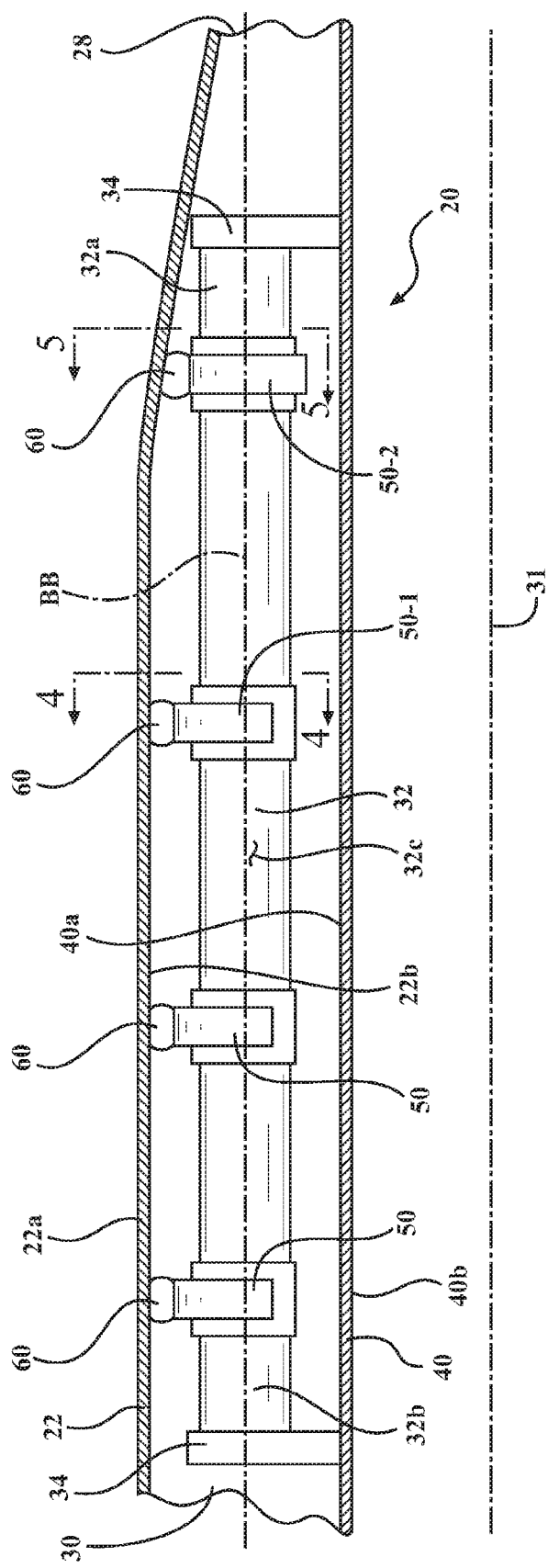
FIG. 2 is a schematic cross sectional plan view of a portion of the door assembly shown in FIG. 1.

Referring to FIGS. 1 and 2, the door assembly 20 includes an exterior panel 22. The exterior panel 22 forms an outer skin of the door assembly 20. Accordingly, the exterior panel 22 defines a first or exterior surface 22a disposable on an exterior of the vehicle, and a second or interior surface 22b facing toward an interior of the vehicle. The exterior panel 22 may be shaped in any suitable manner to meet the design and/or aesthetic requirements of the vehicle.

The exterior panel 22 includes a first edge 28 and a second edge 30. The second edge 30 is spaced from the first edge 28 along an axis 31 extending parallel to a longitudinal axis (not shown) of the vehicle. In the embodiment shown, the first edge 28 is a front edge of the door, and the second edge 30 is a rear edge of the door. However, it should be appreciated that the respective positions of the first edge 28 and the second edge 30 may be reversed from that shown in the Figures.

The door assembly 20 also includes an interior panel 40 coupled to and spaced apart from the exterior panel 22. Interior panel 40 has a first or exterior surface 40a facing toward exterior panel 22, and a second or interior surface 40b facing toward an interior of the vehicle.

Figure 3:
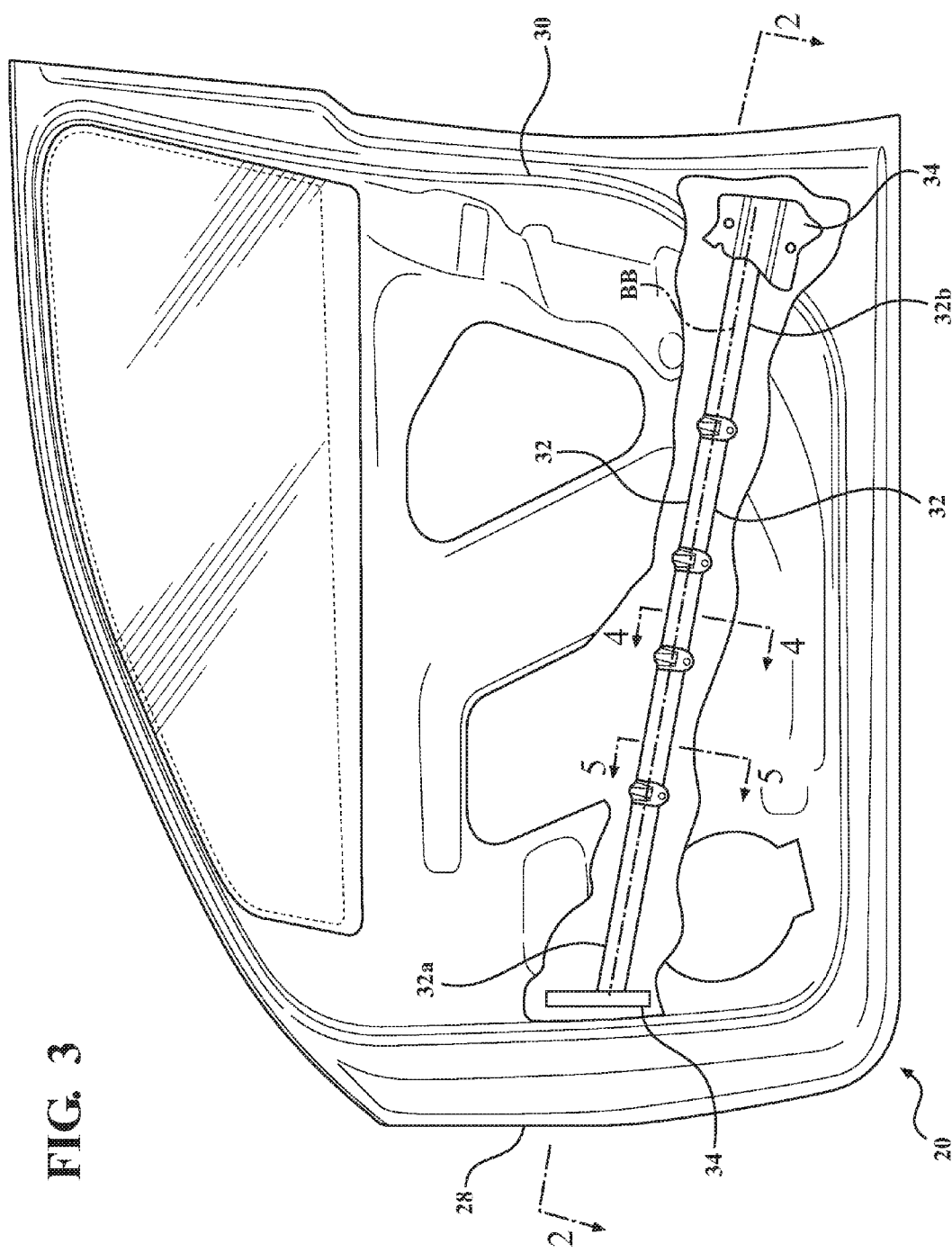
FIG. 3 is a schematic partially cutaway side view of the door assembly shown in FIG. 1, as viewed from an interior of the vehicle.

Referring to FIGS. 1, 2, and 3, an impact beam 32 is coupled to the exterior panel 22. The impact beam 32 may be directly attached to the exterior panel 22, but in the embodiment shown in FIGS. 2 and 3, the impact beam 32 is coupled to the exterior panel 22 via interior panel 40. The impact beam 32 may be coupled to the interior panel 40 in any suitable manner. For example, the impact beam 32 may be directly coupled to the interior panel 40, or may be indirectly coupled to the interior panel 40 through other components. In a particular embodiment, the impact beam 32 is coupled to the interior panel 40 via a pair of supports 34 (shown in FIGS. 2 and 14) disposed proximate opposite ends 32a, 32b of the impact beam 32. In the embodiment shown in FIG. 3, the impact beam 32 resides in an orientation that is angled with respect to the horizontal, with a first end 32a of the impact beam 32 positioned relatively higher near the first edge 28 of the door assembly 20, and a second end 32b of the impact beam 32 positioned relatively lower near the second edge 30 of the door assembly 20). However, it should be appreciated that the impact beam 32 may alternatively be positioned substantially horizontally.

In the embodiment shown in FIGS. 1-6, impact beam 32 has a circular cylindrical cross-sectional shape with a beam central axis X. However, the beam 32 may have any one of a number of alternative cross-sectional shapes. Also, in the embodiment shown in FIGS. 1-6, impact beam 32 has an outer surface 32c structured to enable attachment of a spacer 40 thereto, as described in greater detail below.

In the door assembly 20, the impact beam 32 is spaced apart a distance D from the exterior panel interior surface 22b. The distance D may vary with the longitudinal location along the impact beam. For example, referring to FIGS. 4 and 5, a spacing distance D1 (FIG. 4) between the exterior panel interior surface 22b and the impact beam 32 at a first location "A" along the beam may be greater than a spacing distance D2 between the interior surface 22b and the impact beam 32 at a second location "B" (FIG. 5) along the beam spaced apart from first location "A". Also, the spacing between the impact beam 32 and the exterior panel 22 may vary between vehicle models and/or models of door assemblies.

Figure 4:
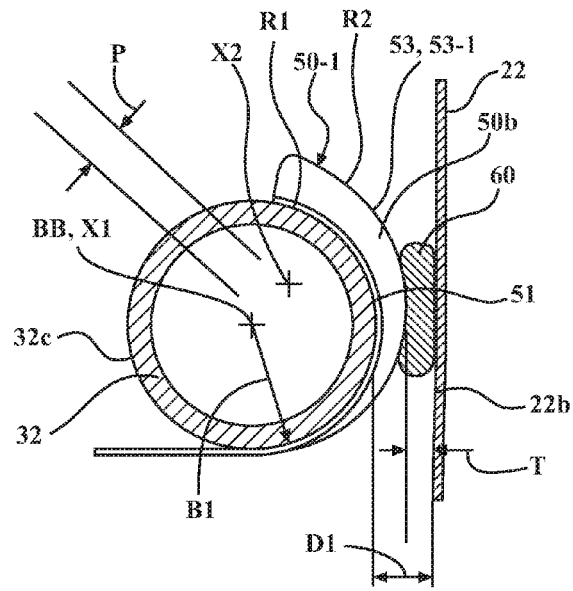
FIG. 4 is a partial cross-sectional view of a portion of the door assembly of FIG. 1 taken at a first location along the impact beam.
Figure 5:
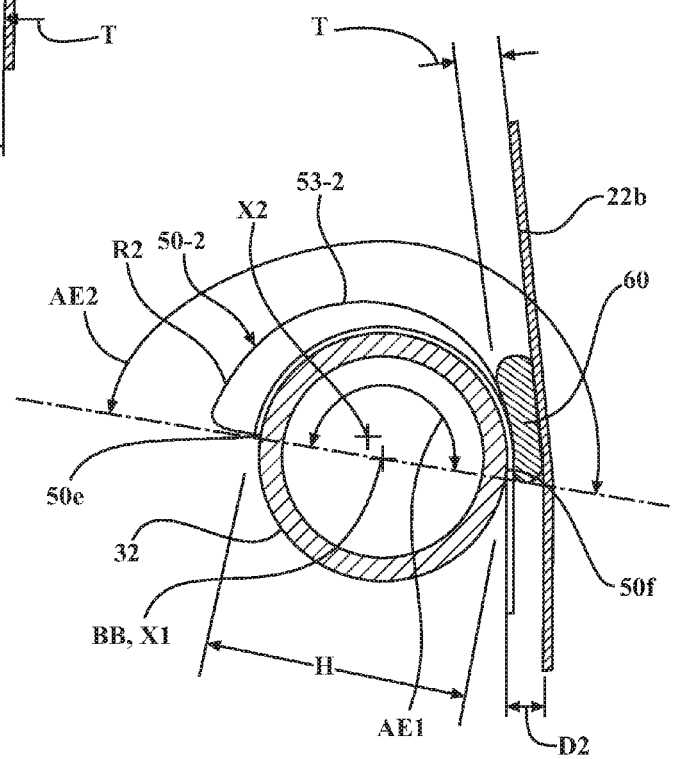
FIG. 5 is a partial cross-sectional view of a portion of the door assembly of FIG. 1 taken at a second location along the impact beam.

Referring to FIGS. 4 and 5, a filler material 60 is positioned generally between the beam 32 and the exterior panel 22 to occupy at least a portion of the space between the beam 32 and the exterior panel. The filler material 60 may be in the form of a known mastic material such as a suitable adhesive, for example. The filler material 60 may be used to promote exterior panel stiffness and may also increase vibration damping.

The filler compound 60 is only capable of spanning or filling a predetermined maximum distance between the impact beam 32 and the exterior panel 22. Accordingly, for the applied filler material to be in contact with both the exterior panel 22 and the impact beam 32, the beam must be disposed within the maximum allowable distance from the interior surface 22b of the exterior panel 22. Since the gap size that may be occupied by the filler material 60 is limited, and to permit the thickness of the applied filler material to be maintained within a specified range over a wide range of spacings between the door exterior panel and the impact beam, a spacer 50 is provided for coupling to the impact beam 32 prior to application of the filler material. The spacer 50 is adjustably positionable on the impact beam so as to permit adjustment of the spacing between the door exterior panel 22 and a filler material application surface 53 formed on the spacer. In the manner described below, this allows the spacing between the door exterior panel 22 and the filler material application surface 53 to be adjusted to within the desired filler material application thickness range, regardless of the spacing between the exterior panel and the impact beam.

Figure 6:
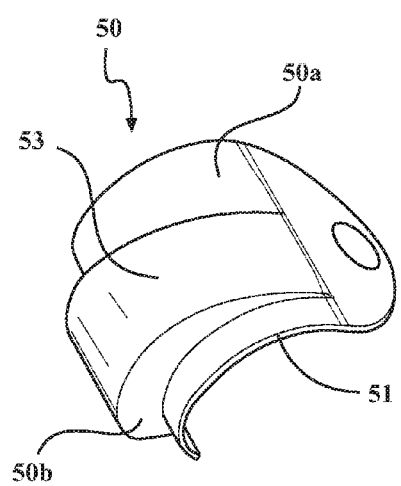
FIG. 6 is a perspective view of a spacer in accordance with one embodiment described herein.

The following spacer description applies to both spacer 50-1 shown in FIG. 4 and spacer 50-2 shown in FIG. 5 because these spacers have the same design, but different angular orientations with respect to beam 32. Referring to FIGS. 4-6, in one embodiment, the spacer 50 includes a base portion 50a and a projection 50b extending from the base portion. In a particular embodiment, the base portion 50a is structured for contacting the impact beam 32 and includes a first surface 51 structured for contacting beam 32. First surface 51 has a first radius of curvature R1 centered on a first axis X1. In a particular embodiment, when the spacer is positioned on the impact beam 32, axis X1 is coaxial with beam central axis BB. The first surface 51 may be cylindrical and the radius of curvature R1 may be dimensioned to be equal or substantially equal to the radius B1 of the outer surface 32c of impact beam 32. The first surface 51 may also be structured for sliding along the impact beam to aid in positioning the spacer along the beam.

Projection 50b has a second or outer surface 53 positioned spaced apart from first surface 51 and positionable to oppose the door panel interior surface 22b. In the embodiment shown, second surface 53 is also cylindrical and has a second radius of curvature R2 centered on a second axis X2 extending parallel to the first axis X1 and spaced apart or offset a distance P from the first axis. Second surface 53 is structured to be positioned between the impact beam and the exterior panel interior surface 22b when the spacer 50 is coupled to the impact beam 32, so as to at least partially span the distance between the impact beam 32 and the interior surface 22b. When so positioned, the second surface 53 serves as a filler material application surface of the spacer 50. In the particular embodiment shown in FIGS. 4 and 5, the second radius of curvature R2 is greater than the first radius of curvature R1.

The angular extent AE2 of the second surface 53 may depend on such factors as the desired variation in achievable spacing from the impact beam 32, the amount by which the spacing will vary as a function of rotation of the spacer, and other pertinent factors. The amount by which the spacing will vary as a function of spacer rotation may depend on factors such as the radius of curvature R2 of the second surface and the amount of offset P between the radius of curvature R2 of the second surface and the radius of curvature R1 of the first surface. Factors such as particular values of the radii of curvature and the locations of the radii of curvature with respect to each other for a given application may be determined iteratively or analytically for a given application using known methods.

The angular extent AE1 of the first surface may depend on the amount of material needed to attach the space to the impact beam, the amount of material needed to support the desired configuration of projection 50b, and other pertinent factors. The angular extent AE1 of the first surface 51 may be less than, the same as, or greater than, the angular extent AE2 of the second surface 53, depending on the requirements of a particular application.

In the embodiment shown in FIGS. 4 and 5, the angular extents AE1 and AE2 of the first and second surfaces 51 and 53, respectively, is 180 degrees. However, either of surfaces 51 and 53 may have any angular extent consistent with the requirements of a particular application. For example, first surface 51 may have an angular extent greater than 180 degrees for purposes of forming a snap or interference fit between the beam 32 and the spacer 50, as described below.

In a particular embodiment, the spacer 50 is structured to form a snap or interference fit connection with the beam 32 when spacer is positioned along the beam. This may be done, for example, by fabricating the base portion 50a so that the first radius of curvature R1 is equal to or slightly less than a radius of curvature of the beam exterior surface 32c, and/or by fabricating the base portion 50a to overlap the impact beam 32 so as to form an opening H between opposite ends 50e and 50f of the base portion that is smaller than a diameter of the impact beam. The spacer 50 may also be formed from a material that is resilient enough to deform to permit opening H to expand to admit the impact beam therethrough, and then return to an undeformed state.

FIGS. 4 and 5 illustrate how an embodiment of the spacer as described herein may be positioned on the impact beam 32 to vary the spacing between the spacer second surface 53 and the exterior panel 22. In FIG. 4, the impact beam 32 is spaced a distance D1 from the exterior panel 22. In this case, a first spacer 50-1 is mounted on the beam 32 at a location "A" along the beam 32 and rotated until the spacing between the exterior panel 22 and a portion of the second surface 53-1 is equal to a desired thickness T for the filler material 60. The thickness T will lie within a range of permissible thicknesses for the filler material. In addition, because the surface 53-1 is curved, the spacer may be rotated so that a maximum distance between the spacer surface 53-1 and the exterior panel 22 is equal to or less than the maximum allowable thickness of the filler material, across the area of the spacer surface 53-1 along which the filler material is to be applied. Thus, when the spacer 50 is in the orientation needed to provide the desired filler material spacing T, the spacer 50-1 occupies a maximum distance D1-T between the impact beam 32 and the exterior panel 22. When the spacer 50-1 is oriented as desired, it may be secured to the impact beam by welding, adhesive application, mechanical fasteners, or any other suitable means. The filler material 60 may then be applied to the gap between spacer second surface 53-1 and the exterior panel 22.

In FIG. 5, the impact beam is spaced a distance D2 from the exterior panel 22, which is less than the distance D1. The cross-section shown in FIG. 5 may illustrate another portion of the same impact beam as shown in FIG. 4. In FIG. 5, another spacer 50-2 (of the same design and dimensions as the spacer shown in FIG. 4) is mounted on the beam 32 and rotated until the spacing between the exterior panel 22 and a portion of the second surface 53-2 is equal to a desired thickness T for the filler material 60. The thickness T will lie within a range of permissible thicknesses for the filler material. In addition, because the surface 53-2 is curved, the spacer may be rotated so that a maximum distance between the spacer surface 53-2 and the exterior panel 22 is equal to or less than the maximum allowable thickness of the filler material, across the area of the spacer surface 53-2 along which the filler material is to be applied. Thus, when the spacer 50-2 is in the orientation needed to provide the desired filler material spacing T, the spacer 50-2 occupies a distance D2-T between the impact beam and the exterior panel 22. When the spacer 50-2 is oriented as desired, it may be secured to the impact beam by welding, adhesive application, mechanical fasteners, or any other suitable means. The filler material may then be applied to the gap between spacer second surface 53 and the exterior panel.

Due to the offset between the radii of curvature R1 and R2 of the first and second surfaces 51 and 53, rotation of the spacer 50 about the impact beam produces either a corresponding reduction or increase in the distance between spacer second surface 53 and exterior panel 22. Thus, in the manner described, a single spacer design may be adjustably positioned (for example, by mounting on and rotation about a desired portion of the impact beam) to correspondingly vary the distance occupied by the spacer between the impact beam and the exterior panel. This enables a desired filler material application thickness to be achieved regardless of the spacing between the impact beam and the exterior panel. In a particular embodiment, the range of desired predetermined thicknesses for the filler material is from 3 millimeters to 5 millimeters inclusive.

As provided for in the above description, a vehicle door assembly may include an exterior panel and an interior panel positioned opposite and spaced apart from the exterior panel. An impact beam may be coupled to the exterior panel between the interior panel and the exterior panel. A spacer is mounted on the impact beam. The spacer has a surface positioned opposite the exterior panel and structured such that a distance from a central axis of the beam to the surface varies according to a location along the surface.

Also as described herein, a method of fabricating a vehicle door assembly is provided. The method includes steps of providing a vehicle door exterior panel; coupling an impact beam to the exterior panel; and providing a spacer structured for securement to the impact beam, the spacer including a surface structured to be adjustably positionable so as to provide any one of a predetermined range of separation distances between the surface and the exterior panel prior to securement of the spacer to the impact beam. The method may also includes steps of positioning the spacer along the beam so as to provide a predetermined separation distance between the surface and the exterior panel, and securing the spacer in the position providing the predetermined separation distance between the surface and the exterior panel.

It should be understood that the preceding is merely a detailed description of various embodiments of this invention and that numerous changes to the disclosed embodiments can be made in accordance with the disclosure herein without departing from the spirit or scope of the invention. Thus, the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A spacer structured for mounting on a vehicle impact beam, the spacer comprising:
    a first surface having a first radius of curvature centered on a first axis; and
    a second surface spaced apart from the first surface, the second surface having a second radius of curvature centered on a second axis extending parallel to the first axis and spaced apart from the first axis.

2. The spacer of claim 1 wherein the second radius of curvature is greater than the first radius of curvature.

3. The spacer of claim 1 wherein the first radius of curvature is equal to an outer radius of the impact beam.

4. A vehicle door assembly including a spacer in accordance with claim 1.

5. A vehicle including a spacer in accordance with claim 1.

6. The spacer of claim 1 wherein the first surface extends along an arc of greater than 180 degrees.

7. The spacer of claim 1 wherein the first surface is structured to be slidable along the impact beam.

8. A door assembly for a vehicle, the assembly comprising:
    an exterior panel;
    an interior panel positioned opposite and spaced apart from the exterior panel;
    an impact beam coupled to the exterior panel between the interior panel and the exterior panel;
    a spacer mounted on the impact beam, the spacer having a surface positioned opposite the exterior panel and structured such that a distance from a central axis of the beam to the surface varies according to a location along the surface; and
    a filler material spaced apart from the impact beam, the filler material being positioned between the spacer surface and the exterior panel and in contact with the spacer surface and the exterior panel.

9. A method for fabricating a vehicle door assembly, comprising the steps of:
    providing a vehicle door exterior panel;
    coupling an impact beam to the exterior panel;
    providing a spacer structured for securement to the impact beam, the spacer including a surface structured to be adjustably positionable so as to provide any one of a predetermined range of separation distances between the surface and the exterior panel prior to securement of the spacer to the impact beam;
    positioning the spacer along the beam so as to provide a predetermined separation distance between the surface and the exterior panel; and
    securing the spacer in the position providing the predetermined separation distance between the surface and the exterior panel.

10. The method of claim 9 wherein the step of positioning the spacer comprises rotating the spacer about the impact beam until the surface is spaced the predetermined separation distance apart from the exterior panel.

11. The method of claim 9 wherein the step of providing a spacer comprises the step of providing a spacer structured to form a snap fit with the beam.

12. The method of claim 9 further comprising the step of positioning a filler material between the spacer surface and the exterior panel and in contact with the spacer surface and the exterior panel.

* * * * *